(12) United States Patent
Xie et al.

(10) Patent No.: US 12,537,205 B2
(45) Date of Patent: Jan. 27, 2026

(54) PREPARATION METHOD OF CATALYST SLURRY FOR FUEL CELL MEMBRANE ELECTRODE ASSEMBLY

(71) Applicant: HAIDRIVER (SHANGHAI) ENERGY TECHNOLOGY CO., LTD, Shanghai (CN)

(72) Inventors: Jiaping Xie, Shanghai (CN); Wei Zhu, Shanghai (CN); Chuanhe Zhu, Shanghai (CN); Zhuang Chen, Shanghai (CN); Yingchao Shang, Shanghai (CN); Jun Shen, Shanghai (CN)

(73) Assignee: HAIDRIVER (SHANGHAI) ENERGY TECHNOLOGY CO., LTD, Shanghai (CN)

( * ) Notice: Subject to any disclaimer, the term of this patent is extended or adjusted under 35 U.S.C. 154(b) by 720 days.

(21) Appl. No.: 17/941,881

(22) Filed: Sep. 9, 2022

(65) Prior Publication Data
US 2023/0091013 A1    Mar. 23, 2023

(30) Foreign Application Priority Data
Sep. 18, 2021 (CN) .......................... 202111098824.3

(51) Int. Cl.
*H01M 4/92* (2006.01)
*H01M 4/86* (2006.01)

(52) U.S. Cl.
CPC ......... *H01M 4/926* (2013.01); *H01M 4/8668* (2013.01); *H01M 4/921* (2013.01)

(58) Field of Classification Search
CPC . B01J 23/40; B01J 23/42; B01J 23/462; B01J 23/468; B01J 23/8913; B01J 23/892; B01J 37/04; B01J 37/343; H01M 4/926; H01M 4/8668; H01M 4/921
USPC ............ 502/5, 101, 185; 429/524, 526, 527; 420/466, 468
See application file for complete search history.

(56) References Cited

U.S. PATENT DOCUMENTS

| 7,153,802 B2 * | 12/2006 | Manco ................ H01M 4/8814 502/185 |
| 2004/0023104 A1 | 2/2004 | Kohler et al. |

FOREIGN PATENT DOCUMENTS

| CA | 2966176 C | * 12/2019 | .......... H01M 8/1041 |
| CN | 112563518 A | 3/2021 | |

(Continued)

*Primary Examiner* — Patricia L. Hailey

(57) ABSTRACT

The present disclosure provides a preparation method of a catalyst slurry for a fuel cell membrane electrode assembly (MEA), including the following steps: preparing a slurry mixture with a catalyst, a dispersing solvent, an ionomer, a thickener, and a surfactant according to a certain mass ratio; subjecting the slurry mixture to pre-dispersion several times in an ultrasonic disperser and a high-shear emulsifying machine successively, to obtain a slurry pre-dispersion; and conducting dispersion on the slurry pre-dispersion in a high-pressure homogenizer to obtain the catalyst slurry. In the present disclosure, components of the catalyst slurry and a dispersion process are optimized and innovated, to construct a more effective three-phase interface. The MEA prepared according to the present disclosure has a significantly improved performance and reduced slurrying time, and is thus suitable for mass production.

8 Claims, 2 Drawing Sheets

(56) References Cited

FOREIGN PATENT DOCUMENTS

JP  2008300212 A * 12/2008 .............. B01J 31/28
KR  20110114992 A * 10/2011 .......... H01M 4/8663

* cited by examiner

PREPARATION METHOD OF CATALYST SLURRY FOR FUEL CELL MEMBRANE ELECTRODE ASSEMBLY

CROSS REFERENCE TO RELATED APPLICATION

This patent application claims the benefit and priority of Chinese Patent Application No. 202111098824.3, filed on Sep. 18, 2021, the disclosure of which is incorporated by reference herein in its entirety as part of the present application.

TECHNICAL FIELD

The present disclosure belongs to the field of preparation of slurry for a fuel cell membrane electrode assembly (MEA), in particular to a preparation method of a catalyst slurry for a fuel cell MEA.

BACKGROUND ART

Proton exchange membrane fuel cell is a device that converts chemical energy into electrical energy with a polymer as an electrolyte, platinum carbon as a catalyst, hydrogen as fuel, and air or pure oxygen as an oxidant. The fuel cell has no other harmful substances except water, and also has a high conversion efficiency, desirable power density, and low-temperature operation. The fuel cell has a wide range of prospects for use in the fields of automotive power supply, stationary power supply, and mobile electronic equipment.

The MEA, as one of core components in the proton exchange membrane fuel cell, is the place for an electrochemical reaction of hydrogen and oxygen. The performance and life of the MEA seriously affect the performance and life of fuel cell. The MEA mainly includes a proton exchange membrane, an anode catalyst layer, a cathode catalyst layer, an anode gas diffusion layer, and a cathode gas diffusion layer. The proton exchange membrane acts to isolate reactant gases in the cathode and anode and transfer protons generated by the anode to the cathode. The anode catalyst layer is a place where hydrogen undergoes an oxidation reaction to produce electrons and protons; and the cathode catalyst layer is a place where oxygen undergoes a reduction reaction and is combined with the protons transferred from the anode to form water. The anode gas diffusion layer evenly distributes reaction gas to the anode catalyst layer, and transfers the electrons generated by the anode catalyst layer out. The cathode gas diffusion layer evenly distributes the reaction gas to the cathode catalyst layer, transfers the electrons from the anode to the cathode catalyst layer, and discharges water produced by the cathode catalyst layer.

In summary, the anode and cathode catalyst layers of the MEA are places of the electrochemical reaction of hydrogen and oxygen; and the anode and cathode catalyst layers are formed by spraying or coating a dispersed catalyst slurry to the proton exchange membrane and then drying. Therefore, the morphological distribution of the catalyst in the catalyst layer has an important influence on the reaction efficiency. It is an urgent problem to be solved in the current catalyst slurry formulation and dispersion process to expose an effective area of the catalyst in the catalyst layer as much as possible to construct a more effective three-phase interface.

SUMMARY

In view of defects existing in the prior art, the present disclosure proposes a preparation method of a catalyst slurry for a fuel cell MEA. In the present disclosure, components of the catalyst slurry and a dispersion process are optimized and innovated, to construct a more effective three-phase interface.

The present disclosure provides a preparation method of a catalyst slurry for a fuel cell MEA, including the following steps:

step A, preparing a slurry mixture with a catalyst, a dispersing solvent, an ionomer, a thickener, and a surfactant according to a mass ratio of 1:(30-40):(0.1-0.5):(5-10):(0.5-1);

step B, subjecting the slurry mixture to pre-dispersion several times by conducting an ultrasonic treatment in an ultrasonic disperser and shearing in a high-shear emulsifying machine successively, to obtain a slurry pre-dispersion; and step C, conducting dispersion on the slurry pre-dispersion in a high-pressure homogenizer to obtain the catalyst slurry.

Further, in step A, the catalyst slurry may include the following components: 1 wt % to 20 wt % of the catalyst, 50 wt % to 90 wt % of the dispersing solvent, 1 wt % to 10 wt % of the ionomer, 0 wt % to 10 wt % of the thickener, and 0 wt % to 2 wt % of the non-ionic fluorocarbon surfactant.

Further, the catalyst may include an anode catalyst and a cathode catalyst;

the anode catalyst may include one or more selected from the group consisting of Pt/C, PtCo/C, PtRu/C, PtNi/C, PtIr/C, PtCoM/C, and PtNiM/C catalysts, or may be selected from the group consisting of a non-precious metal catalyst and a non-metal catalyst for a cathode of a hydrogen fuel cell; and the cathode catalyst may include one or more selected from the group consisting of the Pt/C, the PtCo/C, the PtNi/C, the PtCoM/C, and the PtNiM/C catalysts, or may be selected from the group consisting of the non-precious metal catalyst and the non-metal catalyst for an anode of the hydrogen fuel cell.

Further, the dispersing solvent may include one or more selected from the group consisting of methanol, ethanol, isopropanol, n-propanol, butanol, N,N-dimethylformamide, and toluene.

Further, the ionomer may include one or more perfluorinated, partially-fluorinated or non-fluorinated sulfonic acid resin selected from the group consisting of polytetrafluoroethylene (PTFE), short-side-chain perfluorinated sulfonic acid resin, and long-side-chain perfluorinated sulfonic acid resin.

Further, the thickener may include one or more selected from the group consisting of ethylene glycol, glycerol, sodium alginate, gelatin, polyvinylpyrrolidone, and sodium polyacrylate.

Further, the surfactant may include one or more selected from the group consisting of stearic acid, sodium dodecylbenzenesulfonate, sodium monohydrogen phosphate, sodium dihydrogen phosphate, sodium octadecyl sulfate, sodium stearate, a quaternary ammonium compound, lecithin, fatty acid glyceride, fatty acid sorbitan, polysorbate, and the non-ionic fluorocarbon surfactant.

Further, in step B, the slurry mixture may be subjected to pre-dispersion 1 to 20 times by conducting the ultrasonic treatment in the ultrasonic disperser for 1 min to 10 min and shearing in the high-shear emulsifying machine for 1 min to 10 min successively.

Further, in step C, the dispersion may be conducted at 1 bar to 1,000 bar and 0° C. to 30° C. for 1 min to 30 min.

Compared with the prior art, the present disclosure has the following advantages and positive effects.

(1) The slurry pre-dispersion step can effectively prevent the catalyst and the perfluorinated sulfonic acid resin from agglomerating and adhering to a container wall or a pipe wall, resulting in insufficient homogeneous dispersion.

(2) Compared with the current magnetic stirring and ultrasonic technology, the slurry can be dispersed by the high-pressure homogenizer more uniformly with a greatly shortened dispersion time.

(3) In addition, the non-ionic fluorocarbon surfactant is introduced into the catalyst slurry formulation. The polar groups of non-ionic fluorocarbon surfactant generally include a certain number of oxygen-containing ether bonds and/or hydroxyl groups, where the oxygen-containing ether bonds are generally polyoxyethylene chains or include a polyoxyethylene segment or a polyox-propylene segment. The length of these polar groups can be adjusted, and a change of the length of polar groups can change a hydrophile-lipophile balance (HLB) value of the non-ionic fluorocarbon surfactant. With the promotion of non-ionic fluorocarbon surfactant, the perfluorinated sulfonic acid resin is better dispersed in the dispersant to be more uniformly wrapped on the catalyst, thereby forming more accessible active sites.

(4) The MEA prepared according to the present disclosure has a significantly improved performance and reduced slurrying time, and is thus suitable for mass production.

DETAILED DESCRIPTION OF THE EMBODIMENTS

Figure 1:
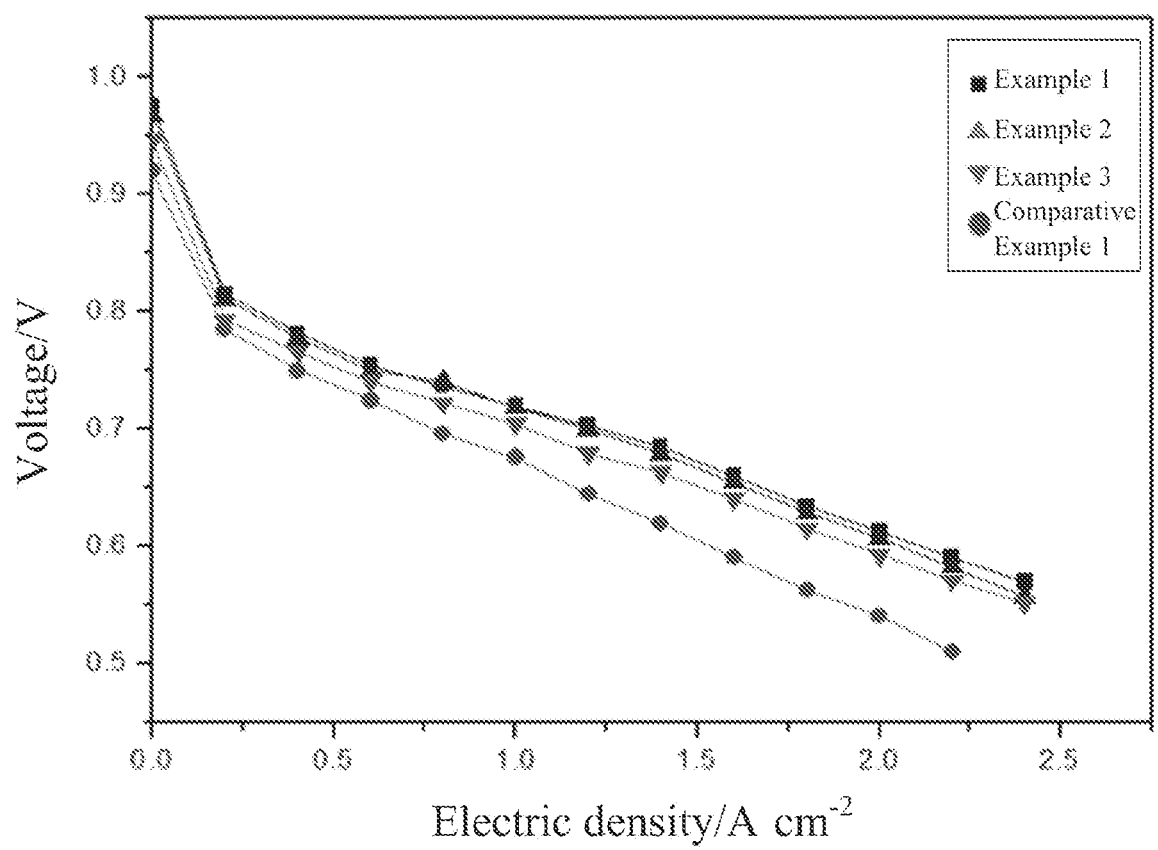
FIG. 1 shows a schematic diagram of polarization curves of membrane electrode assemblies prepared in Examples 1 to 3 and Comparative Example 1 of the present disclosure.

To make the objectives, features and advantages of the present disclosure more comprehensible, the present disclosure is further described below with reference to the accompanying drawings and examples. In the following description, many specific details are set forth in order to facilitate full understanding of the present disclosure, but the present disclosure can also be implemented in other ways other than those described herein. Therefore, the present disclosure is not limited by the specific examples disclosed below.

The present disclosure provides a preparation method of a catalyst slurry for a fuel cell MEA including the following steps:

step A, preparing a slurry mixture with a catalyst, a dispersing solvent, an ionomer, a thickener, and a surfactant according to a mass ratio of 1:(30-40):(0.1-0.5):(5-10):(0.5-1);

step B, subjecting the slurry mixture to pre-dispersion 1 to 20 times by conducting an ultrasonic treatment in an ultrasonic disperser for 1 min to 10 min and shearing in a high-shear emulsifying machine for 1 min to 10 min successively, to obtain a slurry pre-dispersion; and step C, conducting dispersion on the slurry pre-dispersion in a high-pressure homogenizer at 1 bar to 1,000 bar and 0° C. to 30° C. for 1 min to 30 min, to obtain the catalyst slurry.

In step A, the catalyst slurry for the fuel cell MEA may include the following components: 1 wt % to 20 wt % of the catalyst, 50 wt % to 90 wt % of the dispersing solvent, 1 wt % to 10 wt % of the ionomer, 0 wt % to 10 wt % of the thickener, and 0 wt % to 2 wt % of the non-ionic fluorocarbon surfactant.

The catalyst includes an anode catalyst and a cathode catalyst; the anode catalyst includes one or more selected from the group consisting of Pt/C, PtCo/C, PtRu/C, PtNi/C, PtIr/C, PtCoM/C, and PtNiM/C catalysts, or is selected from the group consisting of a non-precious metal catalyst and a non-metal catalyst for an anode of a hydrogen fuel cell; and the cathode catalyst includes one or more selected from the group consisting of Pt/C, PtCo/C, PtNi/C, PtCoM/C, and PtNiM/C catalysts, or is selected from the group consisting of a non-precious metal catalyst and a non-metal catalyst for a cathode of a hydrogen fuel cell.

The dispersing solvent includes one or more selected from the group consisting of methanol, ethanol, isopropanol, n-propanol, butanol, N,N-dimethylformamide, and toluene; the ionomer includes one or more selected from the group consisting of perfluorinated, partially-fluorinated or non-fluorinated sulfonic acid resin selected from the group consisting of polytetrafluoroethylene (PTFE), short-side-chain perfluorinated sulfonic acid resin, and long-side-chain perfluorinated sulfonic acid resin; the thickener includes one or more selected from the group consisting of ethylene glycol, glycerol, sodium alginate, gelatin, polyvinylpyrrolidone, and sodium polyacrylate; and the surfactant includes one or more selected from the group consisting of stearic acid, sodium dodecylbenzenesulfonate, sodium monohydrogen phosphate, sodium dihydrogen phosphate, sodium octadecyl sulfate, sodium stearate, a quaternary ammonium compound, lecithin, fatty acid glyceride, fatty acid sorbitan, polysorbate, and the non-ionic fluorocarbon surfactant.

In step B, the pre-dispersion of slurry refers to the ultrasonic treatment and high-speed shearing of the slurry, to prevent the catalyst and the ionomer resin from agglomerating and adhering to the container wall, resulting in distortion of a proportion of the slurry components. The slurry is dispersed in a high-pressure homogenizer, and the slurry enters into a valve group with adjustable pressure under the action of a reciprocating plunger; a material after instantaneous pressure loss is ejected from a restricting gap at an extremely high flow rate (1,000 m/s to 1,500 m/s), and hits on a collision ring, as one of valve components, resulting in three effects of homogenization: cavitation effect, shear effect, and impact effect, thereby achieving the dispersion. The high-pressure homogenizer has a pressure of 0 bar to 2,000 bar and a dispersion time of 5 min to 60 min during homogeneous dispersion. The catalyst slurry is obtained by a two-step process of pre-dispersion and high-pressure homogeneous dispersion.

The present disclosure is described in detail below with reference to specific examples:

Example 1

1 g of 70% Pt/C catalyst was completely wetted with deionized water, and 20 g of isopropanol was added to completely cover the catalyst. 6 g of perfluorinated sulfonic acid resin dispersion and 0.3 g of non-ionic fluorocarbon surfactant were sequentially added to the obtained catalyst slurry under stirring, and remaining 21 g of the isopropanol and 10 g of the thickener ethylene glycol were added to the catalyst slurry. The slurry was put into an ultrasonic disperser for ultrasonic treatment for 10 min, and then sheared by a high-shear emulsifying machine for 10 min; after repeating the above steps twice, the slurry was poured into a high-pressure homogenizer for homogeneous dispersion. The homogeneous dispersion was conducted at 150 bar and a cooling temperature of 15° C. for 10 min. A small amount of a dispersed slurry was collected for particle size distribution test, and the slurry was sprayed on a proton exchange membrane with a ultrasonic sprayer to prepare an MEA, and the thickness uniformity and polarization performance were characterized. Meanwhile, some CCM samples were remained for SEM characterization.

Example 2

1 g of a 70% Pt/C catalyst was completely wetted with deionized water, and 20 g of isopropanol was then added to completely cover the catalyst. 6 g of a perfluorinated sulfonic acid resin dispersion and 0.5 g of a non-ionic fluorocarbon surfactant were sequentially added to the obtained catalyst slurry under continuously stirring, and remaining 21 g of the isopropanol was added to the catalyst slurry. The slurry was put into an ultrasonic disperser for ultrasonic treatment for 5 min, and then sheared by a high-shear emulsifying machine for 5 min; after repeating the above steps twice, the slurry was poured into a high-pressure homogenizer for homogeneous dispersion. The homogeneous dispersion was conducted at 200 bar and a cooling temperature of 15° C. for 5 min. A small amount of slurry was collected for particle size distribution test, and the slurry was sprayed on a proton exchange membrane with an ultrasonic sprayer to prepare an MEA, and thickness uniformity and MEA polarization properties of the active area were characterized.

Example 3

1 g of a 70% Pt/C catalyst was completely wetted with deionized water, and 20 g of isopropanol was then added to completely cover the catalyst. 5 g of a perfluorinated sulfonic acid resin dispersion and 0.1 g of a non-ionic fluorocarbon surfactant were sequentially added to the obtained catalyst slurry under continuously stirring, and remaining 21 g of the isopropanol was added to the catalyst slurry. 10 g of ethylene glycol was added. The slurry was put into an ultrasonic disperser for ultrasonic treatment for 5 min, and then sheared by a high-shear emulsifying machine for 5 min; after repeating the above steps twice, the slurry was poured into a high-pressure homogenizer for homogeneous dispersion. The homogeneous dispersion was conducted at 100 bar and a cooling temperature of 15° C. for 15 min. A small amount of slurry was collected for particle size distribution test, and the slurry was sprayed on a proton exchange membrane with an ultrasonic sprayer to prepare an MEA, and thickness uniformity and MEA polarization properties of the active area were characterized.

Comparative Example 1

1 g of a 70% Pt/C catalyst was completely wetted with deionized water, and 20 g of isopropanol was added to completely cover the catalyst. 6 g of a perfluorinated sulfonic acid resin dispersion and 0.3 g of a non-ionic fluorocarbon surfactant were sequentially added to the obtained catalyst slurry under stirring, and remaining 21 g of the isopropanol and 10 g of thickener ethylene glycol were added to the catalyst slurry. The prepared slurry was stirred in a magnetic stirrer for 10 min, and then subjected to ultrasonic treatment in an ultrasonic disperser for 30 min, and the above steps were repeated three times to finish the dispersion. A small amount of slurry was collected for particle size distribution test, and the slurry was sprayed on a proton exchange membrane with an ultrasonic sprayer to prepare an MEA, and thickness uniformity and polarization properties of the active area were characterized. Meanwhile, some CCM samples were remained for SEM characterization.

Table 1 shows the thicknesses measured at different positions of the active area of samples obtained in Example 1, Example 2, Example 3 and Comparative Example 1. It can be seen from thickness consistency that the prepared samples of the present disclosure each have a better thickness consistency.

TABLE 1

Comparison of thicknesses measured at different positions in active area of samples

| Sample | Thickness 1 | Thickness 2 | Thickness 3 | Thickness 4 | Thickness 5 | Thickness 6 | Average value |
|---|---|---|---|---|---|---|---|
| Example 1 | 25 μm | 25.6 μm | 24.8 μm | 25.2 μm | 24.5 μm | 24.9 μm | 25 μm |
| Example 2 | 24.5 μm | 24.9 μm | 24.1 μm | 25 μm | 24.1 μm | 24.3 μm | 24.4 μm |
| Example 3 | 25.2 μm | 24.6 μm | 25.7 μm | 26.1 μm | 26 μm | 25.6 μm | 25.5 μm |
| Comparative Example 1 | 26.7 μm | 28.2 μm | 28.9 μm | 30.1 μm | 27.8 μm | 29.1 μm | 28.4 μm |

Note:
the active area thickness test was measured by a Jinan Saicheng CHY-CA thickness tester.

Figure 2:
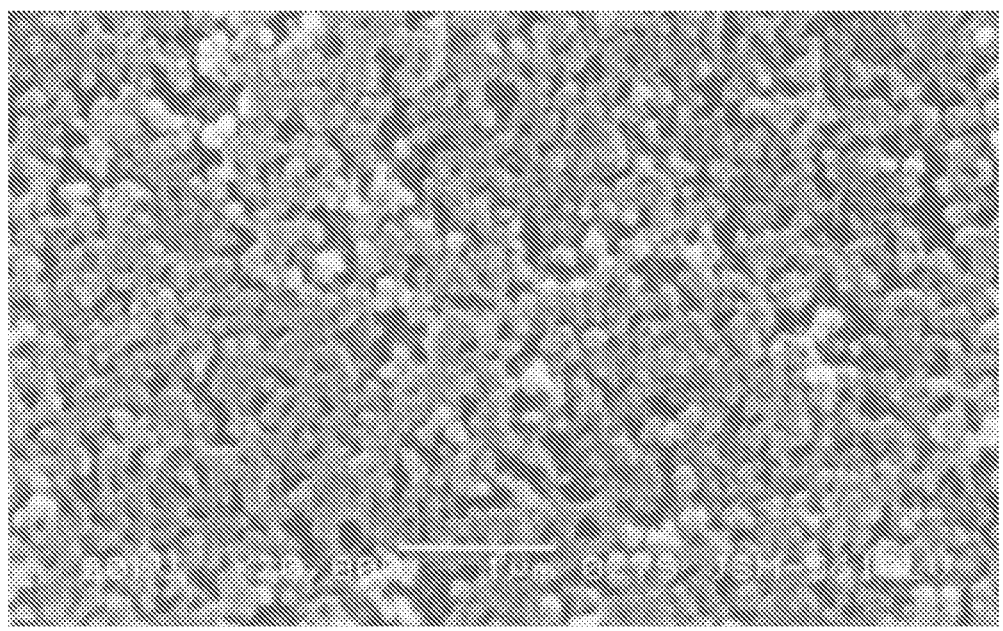
FIG. 2 shows a scanning electron microscope (SEM) photograph of catalyst coated membrane (CCM) prepared in Example 1 of the present disclosure.
Figure 3:
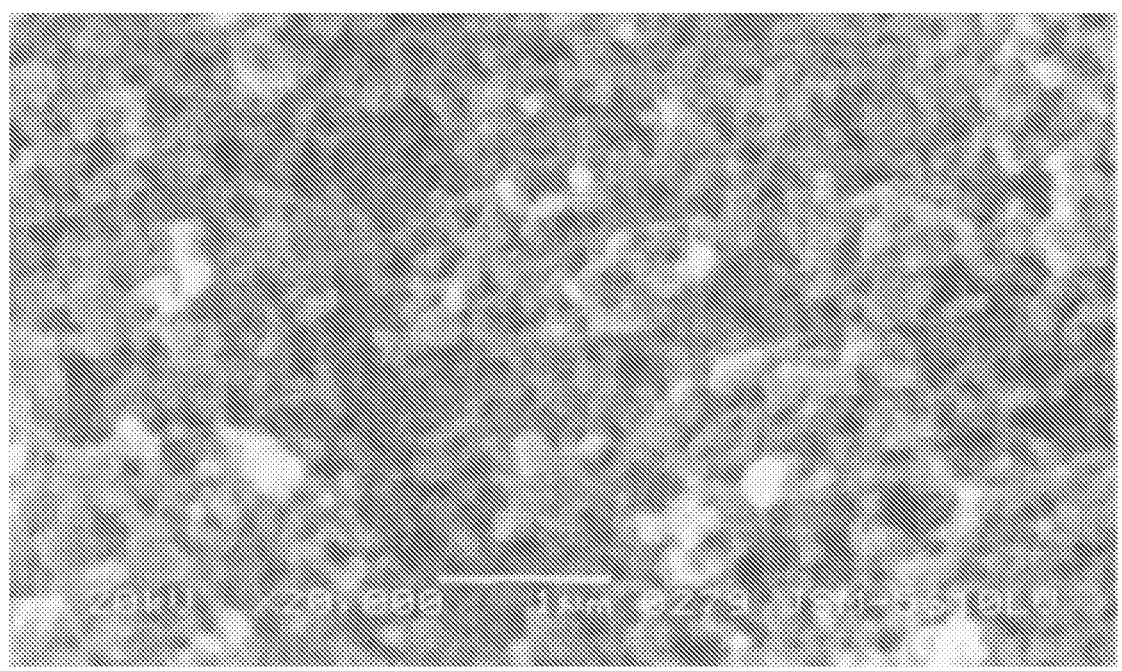
FIG. 3 shows a SEM photograph of CCM prepared in Comparative Example 1 of the present disclosure.

Referring to the FIG. 1-3, FIG. 1 shows polarization curves of the MEAs prepared in Example 1, Example 2, Example 3, and Comparative Example 1. It can be seen from the polarization performance curve that the samples prepared by the present disclosure each have a higher performance, and the polarization curves of MEAs are measured by a Hephas 850e single cell test platform. FIG. 2 and FIG. 3 show SEM photographs of CCMs prepared in Example 1 and Comparative Example 1 of the present disclosure. It can be clearly seen from the SEM images that the slurry prepared by the present invention is more uniformly distributed, that is, more effective three-phase interfaces are constructed, such that the obtained sample has a better performance, and SEM images are taken by a Zeiss Crossbeam 350 electron microscope.

In addition, it should be noted that the catalysts and proton exchange membranes used in the examples and comparative examples of the present disclosure are not limited to any commercialized products. For the convenience of verification, the catalysts used in the anode and cathode are not distinguished, which are of a same type. There is no special limitation on a preparation process of the CCM, and a spraying process, a coating process or a silk screen process can be used.

The above are only preferred examples of the present disclosure, and are not intended to limit the present disclosure in other forms. Any person skilled in the art may change or modify the technical content disclosed above into an equivalent example to be applied in other fields. Any simple amendment or equivalent change and modification of the above example made according to the technical essence of the present disclosure without departing from the content of the technical solution of the present disclosure shall fall within the protection scope of the technical solution of the present disclosure.

What is claimed is:

1. A preparation method of a catalyst slurry for a fuel cell membrane electrode assembly (MEA), comprising the following steps:
    step A, preparing a slurry mixture with a catalyst, a dispersing solvent, an ionomer, a thickener, and a surfactant according to a mass ratio of 1:(30-40):(0.1-0.5):(5-10):(0.5-1);
    step B, subjecting the slurry mixture to pre-dispersion several times by conducting an ultrasonic treatment in an ultrasonic disperser and shearing in a high-shear emulsifying machine successively, to obtain a slurry pre-dispersion; and
    step C, conducting dispersion on the slurry pre-dispersion in a high-pressure homogenizer to obtain the catalyst slurry.

2. The preparation method of the catalyst slurry for the fuel cell MEA according to claim 1, wherein the catalyst comprises an anode catalyst and a cathode catalyst;
    the anode catalyst comprises one or more selected from the group consisting of Pt/C, PtCo/C, PtRu/C, PtNi/C, and PtIr/C catalysts, or is selected from the group consisting of a non-precious metal catalyst and a non-metal catalyst for an anode of a hydrogen fuel cell; and
    the cathode catalyst comprises one or more selected from the group consisting of Pt/C, PtCo/C, and PtNi/C catalysts, or is selected from the group consisting of a non-precious metal catalyst and a non-metal catalyst for a cathode of the hydrogen fuel cell.

3. The preparation method of the catalyst slurry for the fuel cell MEA according to claim 1, wherein the dispersing solvent comprises one or more selected from the group consisting of methanol, ethanol, isopropanol, n-propanol, butanol, N,N-dimethylformamide, and toluene.

4. The preparation method of the catalyst slurry for the fuel cell MEA according to claim 1, wherein the ionomer comprises one or more perfluorinated, partially-fluorinated or non-fluorinated sulfonic acid resin selected from the group consisting of polytetrafluoroethylene (PTFE), short-side-chain perfluorinated sulfonic acid resin, and long-side-chain perfluorinated sulfonic acid resin.

5. The preparation method of the catalyst slurry for the fuel cell MEA according to claim 1, wherein the thickener comprises one or more selected from the group consisting of ethylene glycol, glycerol, sodium alginate, gelatin, polyvinylpyrrolidone, and sodium polyacrylate.

6. The preparation method of the catalyst slurry for the fuel cell MEA according to claim 1, wherein the surfactant comprises one or more selected from the group consisting of stearic acid, sodium dodecylbenzenesulfonate, sodium monohydrogen phosphate, sodium dihydrogen phosphate, sodium octadecyl sulfate, sodium stearate, a quaternary ammonium compound, lecithin, fatty acid glyceride, fatty acid sorbitan, polysorbate, and a non-ionic fluorocarbon surfactant.

7. The preparation method of the catalyst slurry for the fuel cell MEA according to claim 1, wherein in step B, the slurry mixture is subjected to pre-dispersion 1 to 20 times by conducting the ultrasonic treatment in the ultrasonic disperser for 1 minute to 10 minutes and shearing in the high-shear emulsifying machine for 1 minute to 10 minutes successively.

8. The preparation method of the catalyst slurry for the fuel cell MEA according to claim 1, wherein in step C, the dispersion is conducted at 1 bar to 1,000 bar and 0° C. to 30° C. for 1 minute to 30 minutes.

* * * * *